US012810272B2

(12) United States Patent
Reed et al.

(10) Patent No.: US 12,810,272 B2
(45) Date of Patent: Nov. 24, 2026

(54) HOME ENTERTAINMENT CONTENT AND/OR ENHANCED TICKETING SYSTEM AND METHOD

(71) Applicant: NBCUniversal Media, LLC, New York, NY (US)

(72) Inventors: Gregory Reed, Valley Glen, CA (US); Sherry Wong, Pasadena, CA (US); Benjamin Havey, Burbank, CA (US); Erica Marie Dionne, Woodland Hills, CA (US); Jerrlyn Iwata, Studio City, CA (US); Jeremiah Owen Nolet, Daytona Beach, FL (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 18/990,798

(22) Filed: Dec. 20, 2024

(65) Prior Publication Data

US 2025/0209435 A1 Jun. 26, 2025

Related U.S. Application Data

(60) Provisional application No. 63/614,088, filed on Dec. 22, 2023.

(51) Int. Cl.
*G06Q 20/12* (2012.01)
*H04N 21/4627* (2011.01)

(52) U.S. Cl.
CPC ..... *G06Q 20/1235* (2013.01); *H04N 21/4627* (2013.01)

(58) Field of Classification Search
None
See application file for complete search history.

(56) References Cited

U.S. PATENT DOCUMENTS 11,244,032 B1 * 2/2022 Nguyen .................. G06F 9/547
11,308,487 B1 * 4/2022 Foster ................ G06Q 20/3829
(Continued)

FOREIGN PATENT DOCUMENTS

WO WO-2020010023 A1 * 1/2020 ........... H04L 9/3247
WO WO-2020092900 A2 * 5/2020 ............. G06Q 40/03
WO WO-2021231911 A1 * 11/2021 ........... G06Q 30/016

OTHER PUBLICATIONS

Jon M. Garon. "Legal Implications of a Ubiquitous Metaverse and a Web3 Future Legal Implications of a Ubiquitous Metaverse and a Web3 Future." (2022). Retrieved online Nov. 1, 2025. https://scholarship.law.marquette.edu/cgi/viewcontent.cgi?article=5529& context=mulr (Year: 2022).*
(Continued)

*Primary Examiner* — James A Reagan
(74) *Attorney, Agent, or Firm* — Fletcher Yoder, PC

(57) ABSTRACT

A computer-implemented method includes receiving, via processing circuitry and from a user account, an indication of a purchase of a digital content package, where the digital content package includes primary digital content, such as a movie or show, and secondary digital content, such as a content creator supplement to the movie or show. The computer-implemented method also includes assigning, via the processing circuitry and to the user account, a first digital right to the primary digital content for a first limited period of time, and a second digital right to the secondary digital content (e.g., for a second limited period of time, which may differ from the first limited period of time).

17 Claims, 9 Drawing Sheets

(56) References Cited

U.S. PATENT DOCUMENTS 11,606,291 B2 * 3/2023 Simu ..................... H04L 9/0643
11,620,649 B2 * 4/2023 Meinzer ............. G06Q 20/1235
705/7.29
11,636,469 B2 * 4/2023 Weber ................ G06Q 20/3823
705/64
11,789,703 B2 * 10/2023 Jariwala .................... G06F 8/30
717/106
11,983,253 B2 * 5/2024 Goldston ............... G06Q 30/06
12,362,934 B2 * 7/2025 Castinado ............. H04L 9/3247
2005/0149450 A1 * 7/2005 Stefik ..................... G06Q 20/12
375/E7.009
2012/0303490 A1 * 11/2012 Hill ........................ G06Q 30/00
705/27.2
2013/0283362 A1 * 10/2013 Kress ...................... G06F 21/44
726/9
2014/0164507 A1 * 6/2014 Tesch ...................... H04L 51/10
709/204
2017/0213156 A1 * 7/2017 Hammond ............. G06N 3/091
2020/0349625 A1 * 11/2020 Madhuram ............ G06Q 20/02
2022/0210061 A1 * 6/2022 Simu ..................... H04L 9/3239
2022/0309131 A1 * 9/2022 Nguyen ................ H04L 9/0618
2022/0366022 A1 * 11/2022 Goldston ................ G06F 16/61
2022/0366494 A1 * 11/2022 Cella ..................... H04L 9/3231
2022/0391887 A1 * 12/2022 Jakobsson ............. H04L 9/3239
2022/0391888 A1 * 12/2022 Kim ................... G06Q 20/3678
2023/0009908 A1 * 1/2023 Castinado ............. H04L 9/3242
2023/0053969 A1 * 2/2023 Sutton-Shearer .... G06Q 20/405
2023/0062776 A1 * 3/2023 Vosseller ............. G06Q 20/401
2023/0070586 A1 * 3/2023 Kapur .................. G06Q 20/123
2023/0086191 A1 * 3/2023 Jakobsson ............. H04L 9/3231
705/66
2023/0100422 A1 * 3/2023 Jakobsson .............. G06Q 50/16
705/67
2023/0118717 A1 * 4/2023 Quigley ................. G06Q 20/40
705/65
2023/0121779 A1 * 4/2023 Quigley ........... G06Q 20/38215
705/65
2023/0130182 A1 * 4/2023 Mir ....................... H04L 9/3247
713/189
2023/0325814 A1 * 10/2023 Vijayan .............. G06Q 20/3829
705/66
2023/0419283 A1 * 12/2023 Le .......................... G06Q 30/04
2024/0037643 A1 * 2/2024 Lee .................... G06Q 30/0645

OTHER PUBLICATIONS

Web3news. "Decentralized Identity: Passport to Web3." (Nov. 23, 2021). Retrieved online Nov. 1, 2025. https://www.web3news.info/wiki.html (Year: 2021).*

Richard Charkin et al. "Building a Digital Publishing Economy Opportunities and Framework for Development." (Jun. 2023). Retrieved online Nov. 1, 2025. https://www.wipo.int/edocs/mdocs/mdocs/en/wipo_ipr_mvd_23/wipo_ipr_mvd_23_www_615979.pdf (Year: 2023).*

* cited by examiner

SMART CONTRACT INTERFACE

```
MOVIE TICKET SMART CONTRACT
var studioAddress =0xSTUDIO;

var eidr =4.0 /12312412834;

var owner;

var purchaseWhitelist =[ ];

var convert2ESTWhitelist =[ ];

var movieRating =5.0;


function mint ( ) {
  // Users who watch the trailer can mint an Movie NFT
}

function purchase (callerAddress, userAddress) {
  if (callerAdress in purchaseWhitelist) {
    // Upgrade this NFT to a redeemable Theater Ticket
  }
}

function convert2EST (callerAddress, userAddress) {
  if (callerAdress in convert2ESTWhitelist) {
    //Upgrade this NFT so users can watch it on an EST Retailer player
  }
}

function updateRating (callerAddress, rating){
  if (callerAddress= =owner){
    //Add a comment to this movie's community forum
  }
}

function addComment (callerAddress,rating) {
  if (callerAddress= =owner){
    // Update movieRating
  }
}

function addPurchaseWhitelist (callerAddress, newAddress) {
  if (callerAddress= =studioAddress){
    // Add newAddress to purchaseWhitelist
  }
}

function addConvert2ESTWhitelist (callerAddress, newAddress){
  if (callerAddress= =studioAddress){
    //Add newAddress to convert2ESTWhitelist
  }
}

function removePurchaseWhitelist (callerAddress, newAddress){
  if (callerAddress= =studioAddress){
    // Remove newAddress from purchaseWhitelist
  }
}

function removeConvert2ESTWhitelist (callerAddress, newAddress){
  if (callerAddress= =studioAddress){
    // Remove newAddress from convert2ESTWhitelist
  }
}
```

FIG. 9

HOME ENTERTAINMENT CONTENT AND/OR ENHANCED TICKETING SYSTEM AND METHOD

CROSS-REFERENCE TO RELATED APPLICATION

This application claims priority to and the benefit of U.S. Provisional Patent Application Ser. No. 63/614,088, entitled "HOME ENTERTAINMENT CONTENT SYSTEM AND METHOD", filed Dec. 22, 2023, which is hereby incorporated by reference in its entirety for all purposes.

BACKGROUND

The present disclosure relates generally to enhanced ticketing and/or home entertainment content systems and methods, such as those that are Web-3 enabled. More specifically, the present disclosure relates to assigning, transferring, monitoring, storing, and/or executing rights associated with content (e.g., digital content) in enhanced ticketing and/or home entertainment content systems and methods.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Home entertainment products are employed to offer a consumer easily accessible digital content, such as movies, shows, and the like, in the conform of their home. Further, certain types of digital content enable consumer features not available in other environments (e.g., movie theaters), such as the ability to pause, rewind, fast forward, re-watch, etc. However, traditional home entertainment products do not fully leverage the versatile nature of digital content, which may reduce customer satisfaction. Further, traditional home entertainment products and corresponding digital rights can be expensive to maintain, monitor, and operate for many involved parties, including consumers, content creators or curators (e.g., influencers, celebrities, actors, etc.), producers, operators, etc. Accordingly, it is now recognized that improved systems and methods are desired.

Additionally or alternatively, consumers that purchase a content entertainment ticket and consume the corresponding content may not have future access to the content on other platforms. For example, a moviegoer who has purchased a movie ticket may not have access to a movie after using the movie ticket to watch the movie in theater. This lack of future access to the content may be despite the fact that such future access comes at no additional or only incremental cost. Accordingly, it is now recognized that improved systems and methods are desired.

BRIEF DESCRIPTION

Certain examples commensurate in scope with the originally claimed subject matter are summarized below. These examples are not intended to limit the scope of the claimed subject matter, but rather these examples are intended only to provide a brief summary of possible forms of the subject matter. Indeed, the subject matter may encompass a variety of forms that may be similar to or different from the examples set forth below.

In an example, a computer-implemented method includes receiving, via processing circuitry and from a user account, an indication of a purchase of a digital content package, where the digital content package includes primary digital content (e.g., one or more movies or shows) and secondary digital content (e.g., a content creator or curator supplement to the movie or show). The computer-implemented method also includes assigning, via the processing circuitry and to the user account, a first digital right to the primary digital content for a first limited period of time, and a second digital right to the secondary digital content (e.g., for a second limited period of time, which may differ from the first limited period of time).

In another example, one or more tangible, non-transitory, computer-readable media stores instructions thereon that, when executed by processing circuitry, are configured to cause the processing circuitry to perform various functions. The functions include receiving, from a user account, an indication of a purchase of a digital content package, the digital content package including primary digital content (e.g., one or more movies or shows) and secondary digital content (e.g., a content creator or curator supplement to the movie or show). The functions also include assigning, to the user account, a first digital right to the primary digital content for a first limited period of time, and a second digital right to the secondary digital content (e.g., for a second limited period of time, which may differ from the first limited period of time).

In another example, a method for an enhanced ticket includes receiving an indication of a completed user activity for a user. The method also includes generating an enhanced ticket based on the indication, where the enhanced ticket includes a non-fungible token (NFT) with information associated with the completed user activity. The method also includes providing the enhanced ticket to the user.

In another example, a method for an enhanced ticket includes generating an enhanced ticket having a non-fungible token (NFT), receiving an indication of a completed user activity for a user, and associating the enhanced ticket with the user based on the indication, where the NFT includes information associated with the completed user activity. The method also includes providing the enhanced ticket to the user.

In another example, a method for an enhanced ticket includes receiving an indication of a completed user activity for a user. The method also includes modifying an enhanced ticket associated with the user based on the indication, where the enhanced ticket includes a non-fungible token (NFT).

DRAWINGS

These and other features, aspects, and advantages of the present disclosure will become better understood when the following detailed description is read with reference to the accompanying drawings in which like characters represent like parts throughout the drawings, wherein.

Figure 1:
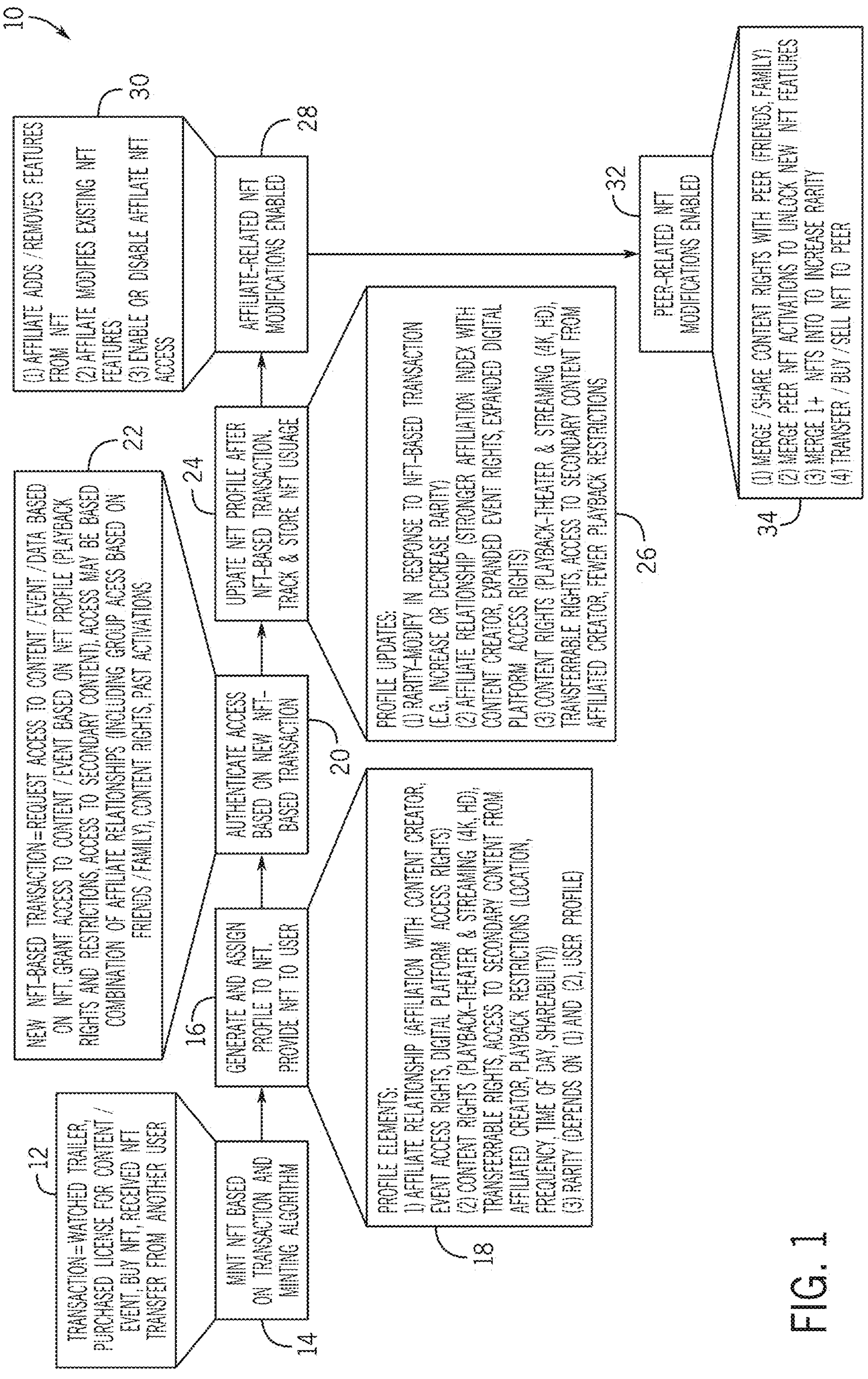
FIG. 1 is a workflow (or framework) employed in a home entertainment content and/or enhanced ticketing system, in accordance with examples of the present disclosure.
Figure 2:
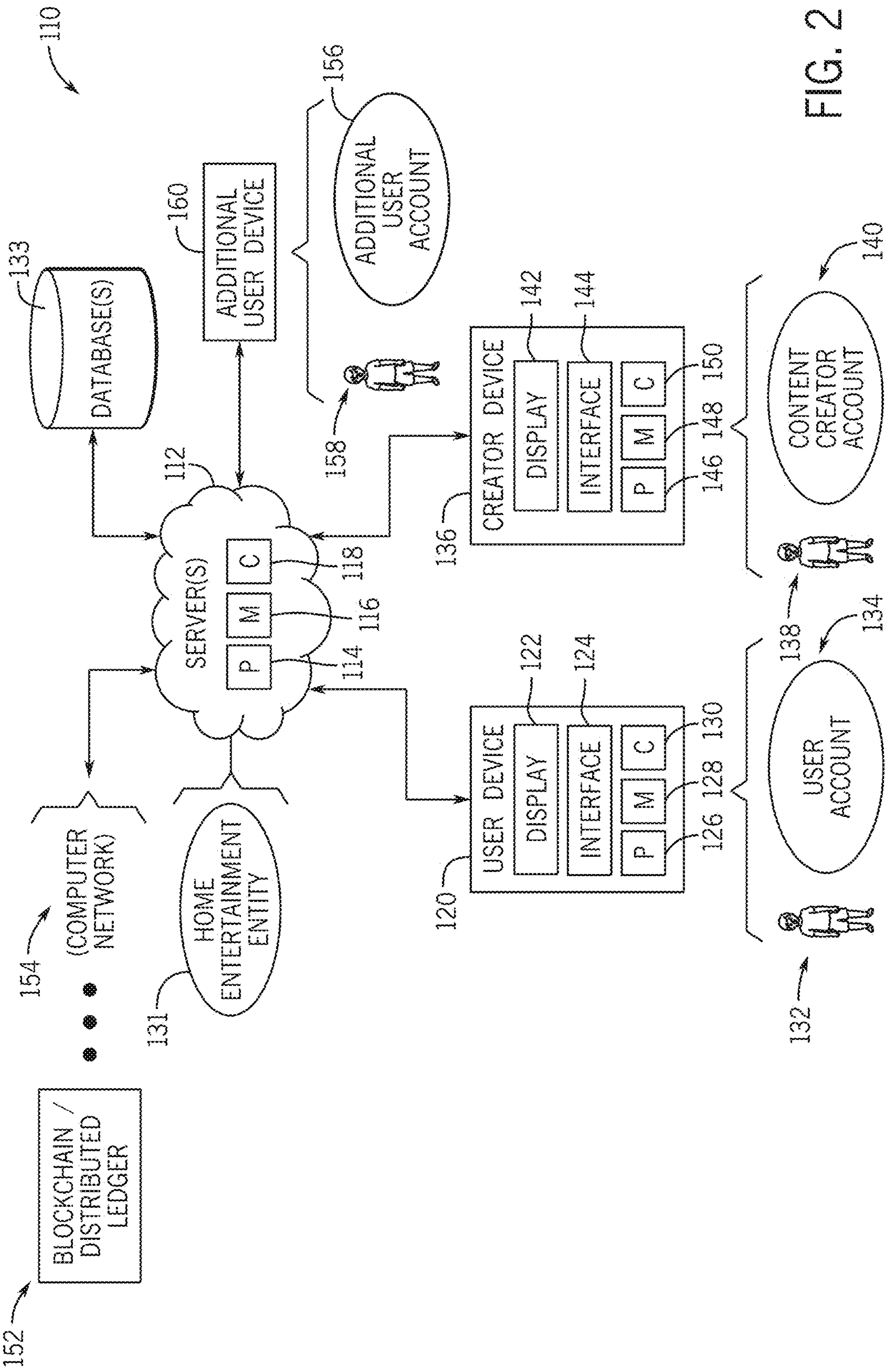
FIG. 2 is a schematic illustration of a home entertainment content system (e.g., computing system) that may implement all or some of the workflow of FIG. 1, in accordance with examples of the present disclosure.
Figure 5:
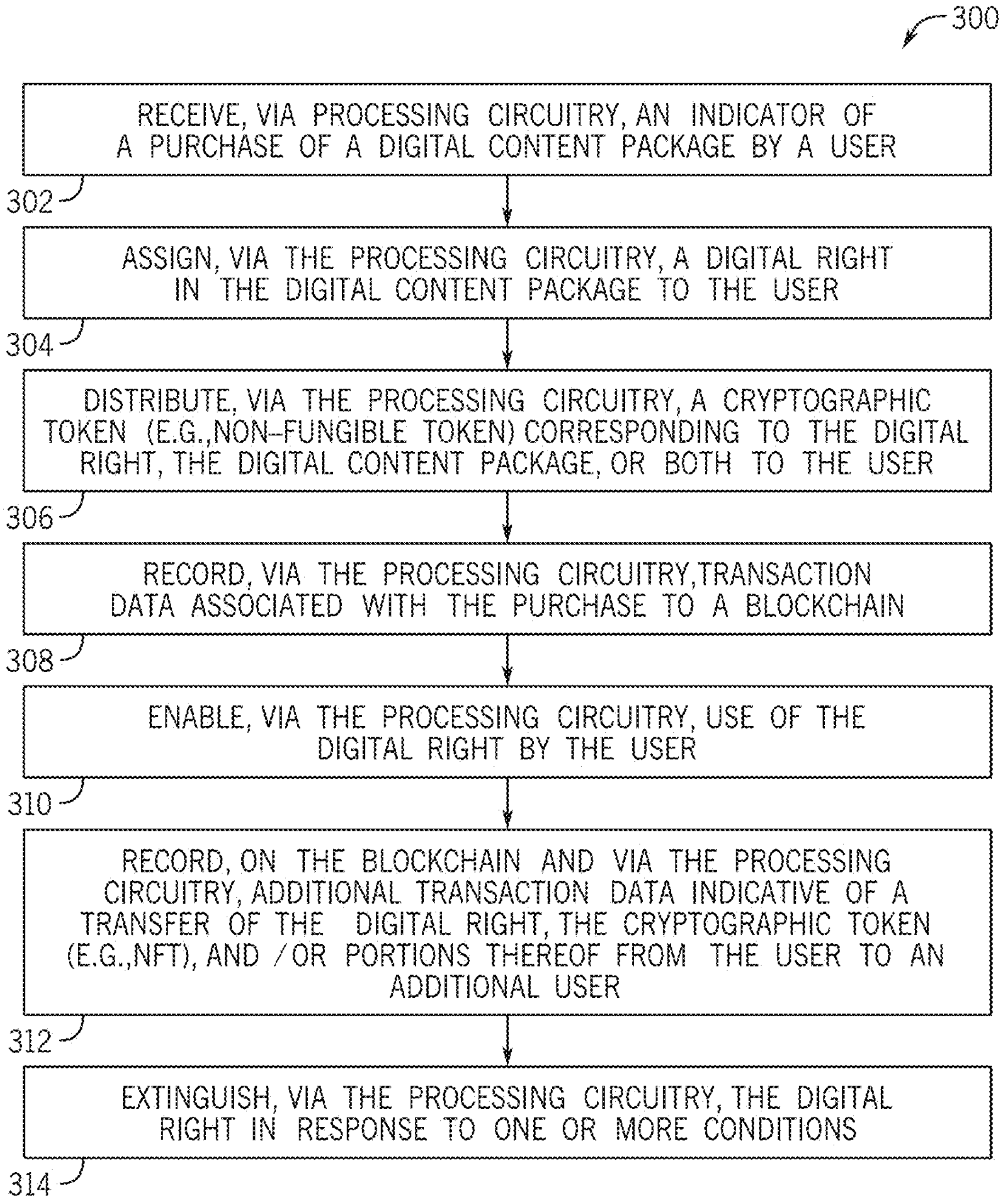
Figure 6:
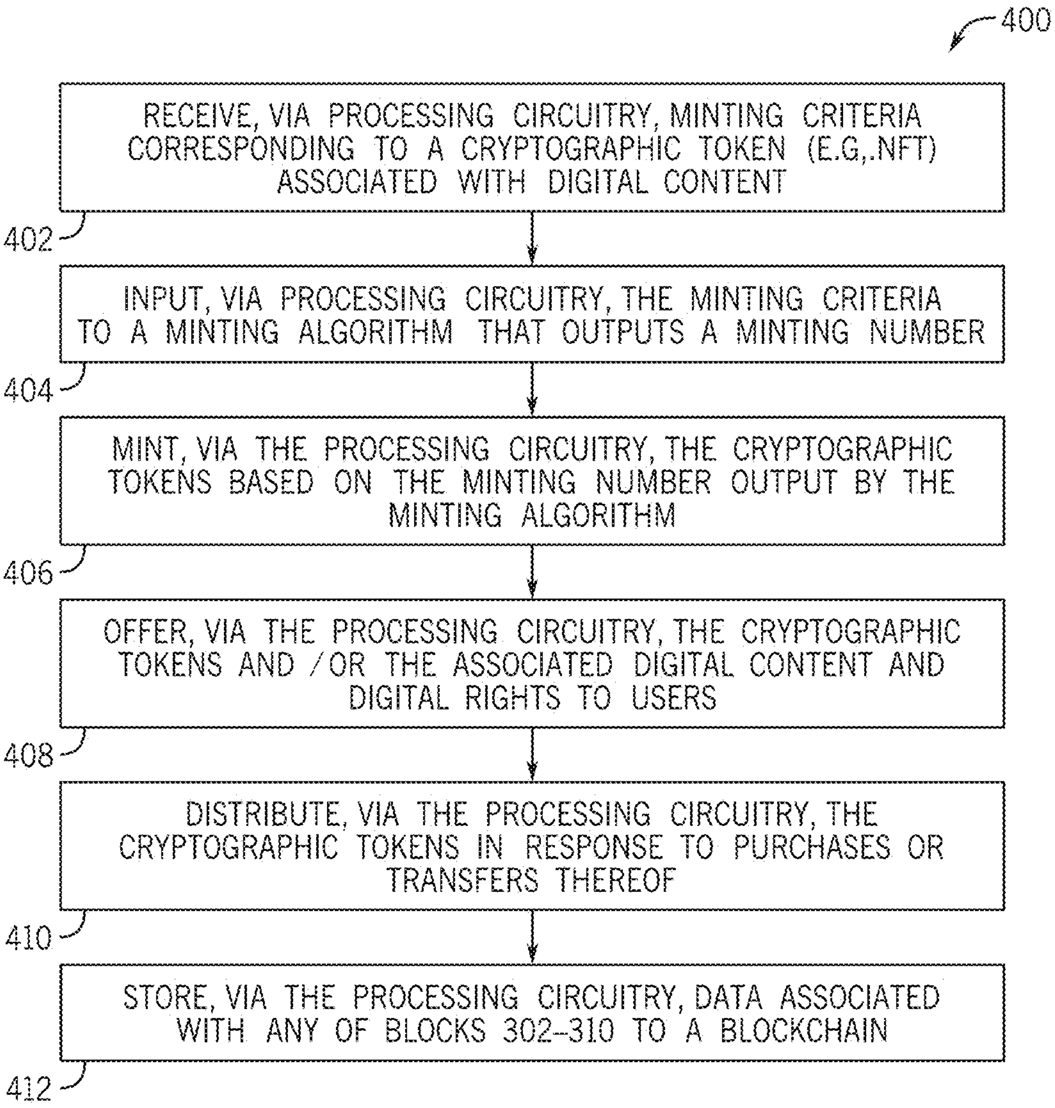
Figure 7:
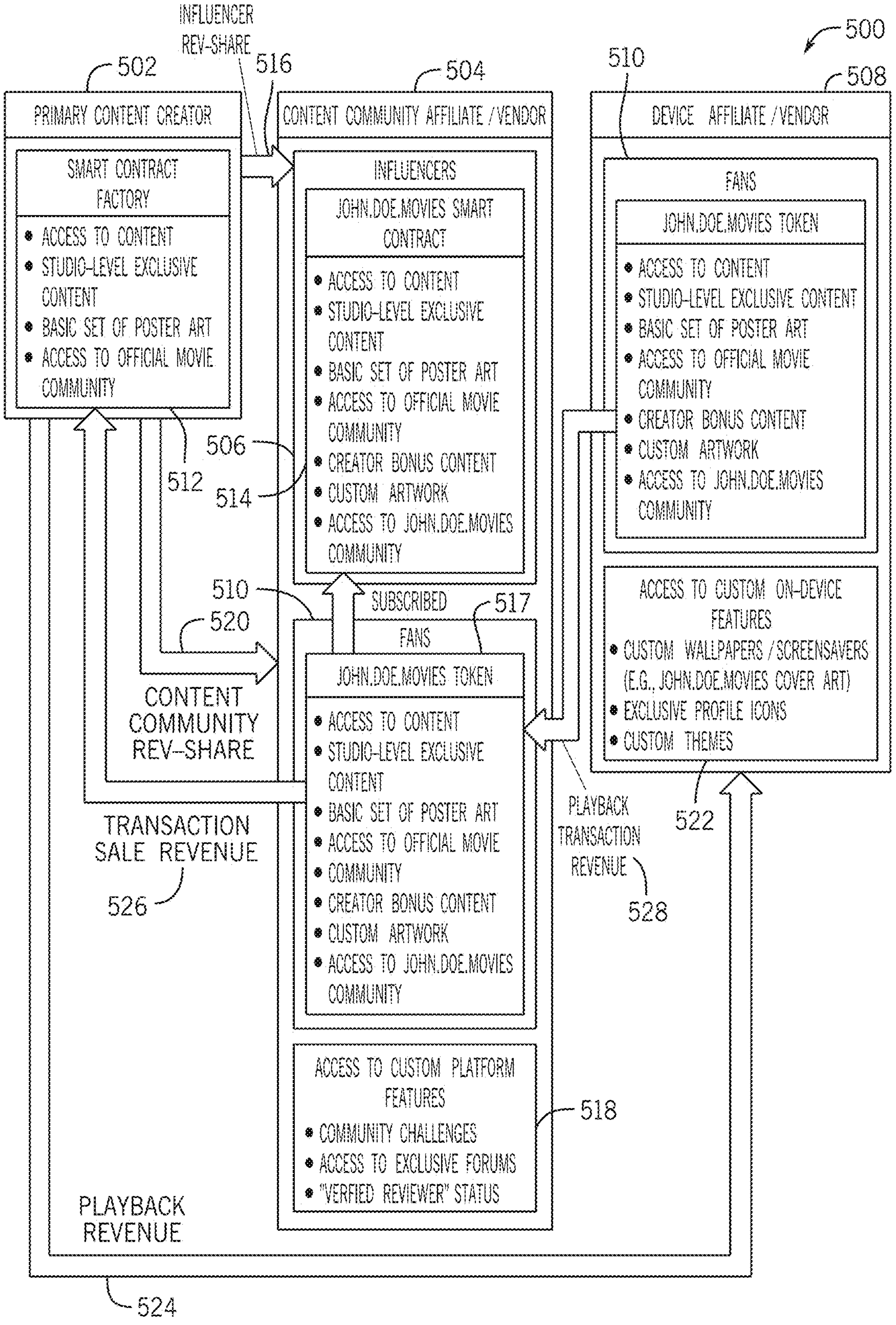
Figure 8:
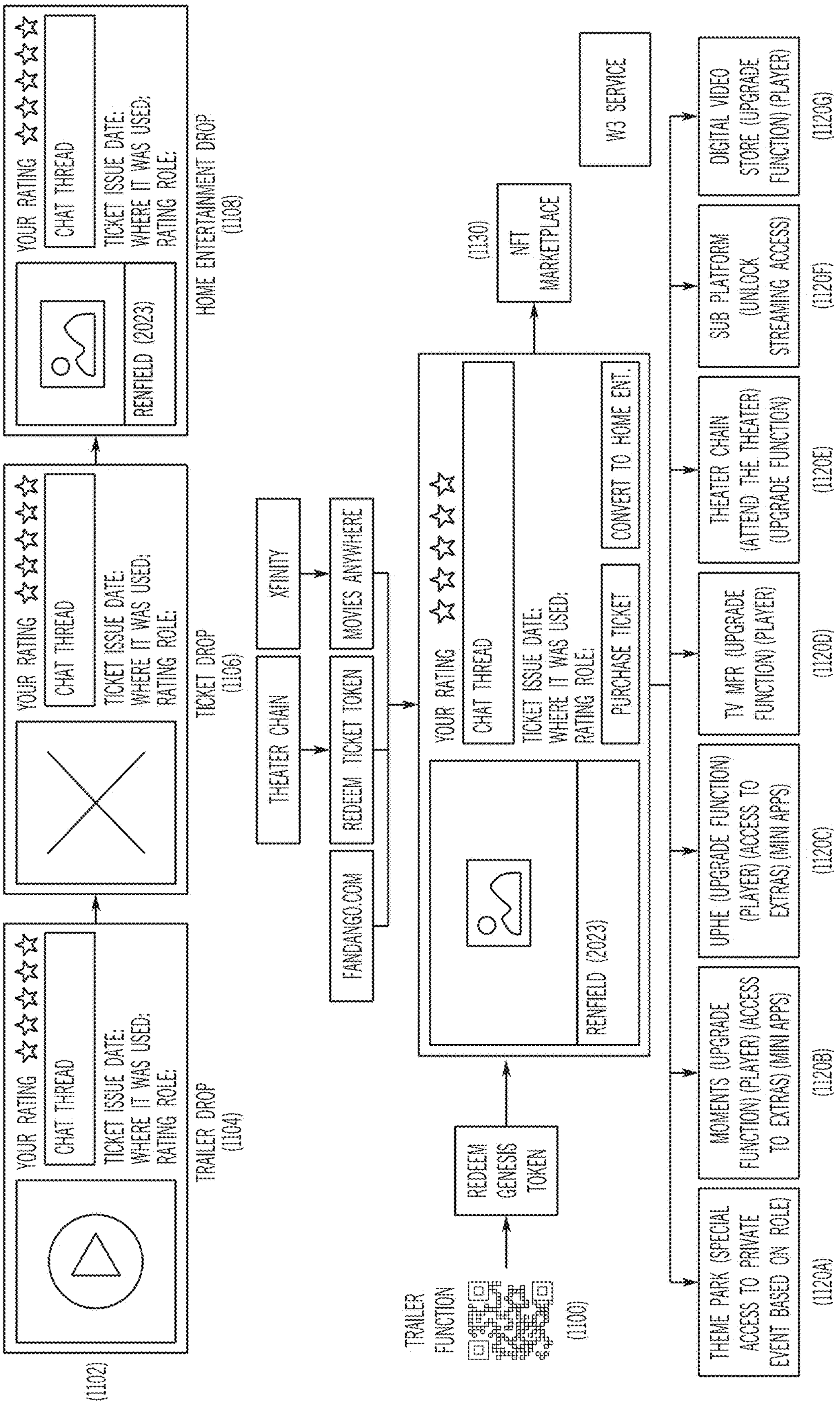

FIG. 5 is a process flow diagram illustrating a method of employing the home entertainment content system of FIG. 2, including assignment and use (e.g., via a cryptographic token, such as a non-fungible token or NFT) of a digital right in digital content in response to a purchase thereof, in accordance with examples of the present disclosure; and FIG. 6 is a process flow diagram illustrating a method of employing the home entertainment content system of FIG. 2, including minting and distributing cryptographic tokens (e.g., non-fungible tokens or NFTs), in accordance with examples of the present disclosure;

FIG. 7 is a schematic illustration of a use case employing some or all of the workflows, systems, and/or methods of FIGS. 1-6, and illustrating various affiliate or vendor relationships therein, in accordance with examples of the present disclosure;

FIG. 8 is a schematic diagram illustrating an enhanced ticketing system that may implement all or some of the workflow of FIG. 1, in accordance with examples of the present disclosure; and FIG. 9 is a diagram illustrating the various functions that may be applied to generate and modify an enhanced ticket via the enhanced ticketing system of FIG. 8, in accordance with examples of the present disclosure.

DETAILED DESCRIPTION

One or more specific examples of the present disclosure will be described below. In an effort to provide a concise description of these examples, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various examples of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, there is a need for home entertainment content systems and methods that leverage the versatile nature of digital content (e.g., movies, shows, etc.) for improved customer satisfaction and reduced maintenance, monitoring, and operational costs. While the term "digital content" is referenced in the context of shows and/or movies in certain examples of the present disclosure, it should be understood that any reference to "digital content" herein may encompass other types of digital products, including but not limited to digital (e.g., intangible) goods, e-books, movie lists, show lists, movie reviews, show reviews, etc.

In accordance with certain examples of the present disclosure, Web-3 enabled home entertainment content systems and methods employ various technologies, such as blockchain technologies, to enable improved digital content packages and features (e.g., accessibility across a variety of platforms and playback options), improved digital content environments (e.g., readily connecting users and content creators), and reduced cost to various involved parties (e.g., consumers, producers, operators, content creators or "curators" such as influencers, celebrities, or actors, etc.). Further, such blockchain technologies may enable true user ownership of their data, decouples user data from actual applications, allows for seamless facilitation of data across platforms and third-party experiences, enables tokenization of assets by users, content creators, and businesses, enables new revenue streams, procures audit trails via public ledger of transactional history, etc.

Additionally or alternatively, there is an opportunity to address the need for consumers that purchase a content entertainment ticket (e.g., a movie ticket) to also possess or have a license to the content once the content is available on different platforms. For example, a moviegoer who has purchased an enhanced ticket would be able to watch the movie during its theatrical release at the theaters and watch the movie again (e.g., at no additional or only incremental cost) based on the previously purchased enhanced ticket when the movie is available for home entertainment. While the term "enhanced ticket" is referenced in the context of movie or theater tickets in certain examples of the present disclosure, it should be understood that any reference to "enhanced ticket" herein may encompass other types of digital content and/or digital products. That is, description of "enhanced ticket" in the context of movie or theater tickets is merely exemplary and corresponding technologies may be applied with respect to other types of digital content or digital products.

In general, examples of the present disclosure may improve a customer (e.g., content consumer) experience, improve content community interactions, improve interactions between various entities (e.g., movie studios, movie producers, content creators, customers, device manufacturers, etc.), and the like. These and other aspects of the present disclosure are described in detail below with reference to the drawings.

It should be noted that reference to the terms "purchase" and "buy," in accordance with the present disclosure, may correspond to the purchase of a license or other instrument granting some right(s) to the purchaser to certain content (e.g., digital content). That is, use of the terms "purchase" and "buy" should be broadly interpreted to mean that the purchaser receives true ownership of the content (e.g., digital content) at issue or that the purchaser receives at least some right(s) in the content (e.g., digital content) at issue. Such right(s) may come in the form of a license, for example, that expires and/or is subject to other limitations (e.g., transfer limitations, functional limitations, etc.).

Turning now to the drawings, FIG. 1 is an example of a workflow 10 (also referred to as a framework) employed in a home entertainment content and/or enhanced ticketing system. In the illustrated example, the workflow 10 includes, as shown in block 12, identifying transaction activity (also referred to as user activity) that may initiate, alone or in combination with other steps in the workflow 10, various functions. The transaction activity may include, for example, a user watching a movie trailer, purchasing a license or ticket for content (e.g., digital content) or an event (e.g., a movie showing), purchasing a non-fungible token (NFT) associated with content or an event, receiving an NFT transfer from another user, or the like.

The workflow 10 also includes minting (block 14) an NFT based on the transaction activity at block 12 and a minting algorithm. The minting algorithm, for example, may receive the transaction activity identified at block 12, among other possible data. In some examples, the minting algorithm is limited by a minting capacity (or threshold) established by a party, such as a movie studio or producer, a content creator, a content community affiliate or vendor, a device affiliate or vendor (e.g., a device manufacturer), or the like. As described in greater detail with reference to other steps of the workflow 10, the NFT minted at block 14 may be employed by a user (e.g., the user receiving the NFT, a subsequent user that transacts with the user for the NFT, etc.) to access certain content entitled to a possessor of the NFT. As one example, the NFT may be minted in response to transaction activity associated with a user purchasing a movie ticket corresponding to a movie shown in theater, where the NFT enables the user (or another user) to later watch the movie again on a separate platform (e.g., a streaming platform). As another example, the NFT may be minted in response to transaction activity associated with a user subscribing, transacting, or otherwise interacting with a content creator on a content community platform, such as a movie review aggregation platform, where the NFT enables the user (or another user) to access to secondary content (e.g., bonus content, content creator videos produced by the content creator, etc.), and/or other benefits.

The workflow 10 also includes, as shown in block 16, generating and assigning a profile to the NFT and providing the NFT to the user. As illustrated in block 18, elements of the profile may include affiliate relationship(s), content right(s), and a rarity score associated with the NFT. For example, the affiliate relationship(s) may identify one or more parties associated with the NFT, such as the user, a content creator, a movie studio or producer, a content community affiliate or vendor, a device affiliate or vendor (e.g., a device manufacturer), a movie theater, or the like. In some examples, data indicative of the affiliate relationship(s) in the profile elements of the NFT may include information indicating revenue sharing agreements between two or more such affiliates. Further, data indicative of the affiliate relationship(s) may indicate entitlements granted by one affiliate to another, such as a movie studio entitling a content creator to distribute content rights (e.g., digital playback rights) in a movie or show to a user, a movie studio entitling a movie theater to distribute content rights (e.g., digital playback rights) in a movie or show to a user, etc. Other affiliate relationships are also possible and described in greater detail with reference to later drawings.

As previously described, the content right(s) may include future playback of content (e.g., primary content, such as a movie or show), rights associated with transferring the NFT to another user, access to secondary content (e.g., bonus content, content creator videos produced by the content creator, etc.), and/or other benefits. Other rights may also be included in the profile, such as rights to merchandise discounts. In some examples, the profile elements also include restrictions, such as content restrictions. For example, certain benefits (e.g., the content rights or benefits described above) may be limited in scope, such as limited in time, transferability or shareability, frequency, locations, etc. The rarity score associated with the NFT and stored in the NFT profile may indicate, for example, an amount of similar NFTs already minted or allotted to be minted, a value of the NFT, a numerical minting order of the NFT, or any combination thereof. Data associated with the NFT profile elements may be stored to a blockchain (e.g., a smart contract, a digital distributed ledger) as described in greater detail with reference to later drawings.

The workflow 10 also includes, as shown in block 20, authenticating access (e.g., to content, such as digital content) based on a new NFT-based transaction. As shown in block 22, the new NFT-based transaction may include, for example, a request to access content (e.g., primary digital content, secondary digital content, etc.) based on the NFT. For example, the request may be approved in response to identifying the NFT via the blockchain and/or associated technologies. In certain examples, access may be permitted based on one or more (e.g., a combination) of affiliate relationships (including group access based on friends and family plans), content rights, and/or past activations.

The workflow 10 also includes, as shown in block 24, updating the NFT profile after the NFT-based transaction referenced above with respect to blocks 20 and 22. For example, as shown in block 26, profile updates may include updates to the rarity score, the affiliate relationship(s), the content right(s) and/or other right(s) (including restrictions), etc. The rarity score described in greater detail above may be subject to change, for example, if certain rights associated with possession of the NFT have been extinguished or otherwise wholly or partially depleted. In some examples, affiliate relationships are changed (e.g., at block 24) in response to use of the NFT to access certain content rights and/or in response to new agreements between two or more parties (e.g., affiliates) associated with the NFT.

The workflow 10 also includes, as shown in block 28, enabling or otherwise executing affiliate-related NFT modifications. For example, as shown in block 30, affiliates may add or remove features from (or permitted via possession of) the NFT. Additionally or alternatively, NFT access by or to affiliates may be enabled or disabled. The workflow 10 also includes peer-related NFT modifications, as shown in block 32. For example, as shown in block 34, content rights may be merged or shared between peers (or users), such as between family and/or friends, NFT activations may be merged to unlock new NFT features and/or enhance a rarity score of the merged NFT(s), and/or NFTs may be transferred, bought, or sold.

As an example, an NFT may include a content right enabling a possessor of the NFT to playback a movie on a particular platform three times. After a first user has watched the movie once on the platform by way of the NFT, the first user may seek to transfer the NFT to a second user enabling the second user to watch the movie. After the second user has watched the movie once on the platform by way of the NFT, the second user may seek to transfer the NFT to a third user enabling the third user to watch the movie. After the third user has watched the movie once on the platform by way of the NFT, the content right enabling the possessor of the NFT to playback the movie three times on a particular platform may be extinguished. As the NFT is used in the manner outlined above, and/or as the NFT is transferred between users in the manner outlined above, the profile elements of the NFT may be updated (e.g., on the blockchain) such that the content right(s) associated with the NFT are monitored. In some examples, the NFT includes certain digital content (e.g., aesthetics, such as art work, the rarity score, etc.) that changes as the NFT is used and/or transferred, enabling users interested in transacting for the NFT to understand the content right(s) available with possession of the NFT.

The description of the workflow 10 of FIG. 1 above is non-limiting and included merely as an example of NFT-related and/or blockchain-related technologies, such as Web-3 technologies, employed in home entertainment content and/or enhanced ticketing systems and methods. Home entertainment content and/or enhanced ticketing systems and methods, which may employ all or some of the workflow 10 illustrated in FIG. 1 and described in detail above, are described in greater detail below with reference to FIGS. 2-9.

FIG. 2 is schematic illustration of an example of a home entertainment content system 110 (e.g., computing system), referred to as "the system 110" in certain instances of the present disclosure, that may employ all or some of the workflow illustrated in FIG. 1. As described in detail below, the system 110 may be employed to facilitate purchases of various digital content packages, distribute or otherwise assign digital rights to the digital content packages in response to such purchases, monitor, withdraw, and/or change the digital rights based on various criteria (e.g., via blockchain technology), and other aspects of the present disclosure.

In the illustrated example, the system 110 includes one or more servers 112 (e.g., multiple servers) having processing circuitry 114 (e.g., one or more processors), memory circuitry 116 (e.g., one or more memories), and communication circuitry 118 (e.g., one or more wired or wireless communication devices, such as one or more transceivers). That is, it should be understood that the processing circuitry 114, the memory circuitry 116, and/or the communication circuitry 118 may be distributed across multiple servers 112. The memory circuitry 116 stores instructions thereon that, when executed by the processing circuitry 114, causes the processing circuitry 114 to perform various functions. Further, the communication circuitry 118 may be employed to receive and/or transmit communications.

As shown, a user device 120 (e.g., mobile phone, tablet, laptop, personal computer, etc.) of (or interacting with aspects of) the system 110 may include a display 122, an interface 124, processing circuitry 126, memory circuitry 128, and communication circuitry 130. Although only one instance of the user device 120 is illustrated in FIG. 2, it should be understood that multiple instances of the user device 120 may be employed in, or interact with, the system 110 in accordance with the present disclosure. The user device 120 may correspond to, for example, a user 132 and/or a user account 134 of the user 132. The user 132 may employ the user device 120 to register the user account 134 with a home entertainment entity 131 (e.g., digital content entity) that owns, operates, or otherwise manages the servers 112. In some examples, data indicative of the user account 134, along with other data associated with the present disclosure, may be stored in one or more database(s) 133 of the system 110. Further, in some examples, the user account 134 may include (or be associated with) a digital wallet of the user 132.

The home entertainment entity 131 may offer, via the system 110, digital content packages available for purchase by the user 132 via the user device 120 and within the user account 134. Each digital content package may include a variety of digital content, such as movies, shows, collections of movies and/or shows, movie lists, content creator (or curator) reactions, content reviews, etc. Information regarding the digital content packages may be illustrated on the display 122 of the user device 120, and the interface 124 of the user device 120 may be employed by the user 132 to purchase the digital content package. As an example, the digital content packages may include primary digital content corresponding to one or more movies or shows, and secondary digital content corresponding to content creator (or curator) supplements to the one or more movies or the shows.

A content creator device 136 (e.g., mobile phone, tablet, laptop, personal computer, etc.) of (or interacting with aspects of) the system 110 may be employed by a content creator 138 (e.g., influencer, celebrity, actor, etc.) having a content creator account 140 registered with the home entertainment entity 131 (e.g., where data indicative of the content creator account 140 is stored to the one or more databases 133). The content creator device 136 may include a display 142, an interface 144, processing circuitry 146, memory circuitry 148, and communication circuitry 150, all of which are configured to enable the content creator 138 to interact with the system 110 (e.g., via the content creator account 140), as described in detail below.

The content creator 138 may employ the content creator device 136, for example, to generate and/or upload the secondary digital content (e.g., corresponding to content creator supplements) described above to the servers 112 of the home entertainment entity 131. In some examples, the content creator 138 requests approval of the secondary digital content by the home entertainment entity 131 prior to the home entertainment entity 131 offering the secondary digital content (e.g., corresponding to the content creator supplement) in a digital content package (e.g., along with the primary digital content corresponding to one or more movies or shows). For example, the home entertainment entity 131 may employ manual or automated techniques (e.g., via the servers 112) to determine an appropriateness of the secondary digital content as it relates to the primary digital content (e.g., based on content maturity ratings). In some examples, a higher maturity rating of the primary digital content may allow for less restrictive maturity requirements of the secondary digital content. In examples employing the above-described approval process or otherwise, the secondary digital content may be published and then made available for purchase (e.g., as a part of digital content packages or separately). Content creator supplements corresponding to the secondary digital content may include, for example, movie reviews, content creator (or "curator") reactions, movie collections, favorite movie lists (e.g., daily lists), gaming features associated with the movie or show at issue, cryptographical currencies (e.g., tokens, such as non-fungible tokens or NFTs), etc. Content creators, such as the content creator 138 in FIG. 2, may periodically update content creator supplements to add, remove, deactivate, or otherwise change material offered by the system 110. Further, in some examples, additional content creator supplement material may include non-digital features, such as physical products corresponding to the secondary digital content, corresponding to the movie or show associated with the primary digital content, etc. Further still, in some examples, content creator supplement material may be distributed to the user 132 by the content creator 138 based on the user 132 subscribing (e.g., via paid subscription) to a channel of the content creator 138, where rights to such material are assigned and/or monitored via NFTs (e.g., created by the content creator 138).

In some examples of the present disclosure, a computing application (e.g., a desktop and/or mobile application, such as a social media application, including a Web-3 marketplace or digital storefront) offered via the system 110 (e.g., hosted at least in part by the servers 112) may enable the user 132 corresponding to the user device 120 and the content creator 138 corresponding to the content creator device 136 to interact. For example, the user 132 may employ the user device 120 to access the application and search for content, such as the primary digital content and/or the secondary digital content generated by the content creator 138 corresponding to the content creator device 136. The servers 112 may receive an indication of a purchase of a digital content package from, for example, the user device 120 corresponding to the user 132 and/or the user account 134 of the user 132. In response to receiving the indication, the servers 112 may assign various digital rights to the user device 120 and/or the user account 134 corresponding to the user device 120 (e.g., via issuance of at least one non-fungible token or NFT corresponding to such digital rights). The digital rights may enable the user 132 to watch or otherwise access the primary and/or the secondary digital content via the user device 120 and via one or more digital platforms. In some examples, the user account 134 may enable the user 132 to access digital content via multiple devices (e.g., the user device 120 and at least one other user device).

The digital rights referenced above may include, for example, a first digital right (e.g., including one or more rights) corresponding to the primary digital content (e.g., one or more movies or shows) and a second digital right (e.g., including one or more rights) corresponding to the secondary digital content (e.g., the content creator supplement). In some examples, the first digital right, the second digital right, or both may be limited in time. For example, the first digital right may enable the user 132 to access the primary digital content (e.g., the movie or show) for a first limited period of time. Further, the second digital right may enable the user 132 to access the secondary digital content (e.g., the content creator supplement) for a second limited period of time, which may be the same as or different than the first limited period of time. Additionally or alternatively, the digital rights may enable the user 132 to access the digital content for a certain number of views (e.g., the user 132 may view the primary digital content once, or twice, or more). In this way, the digital content package may include digital content (e.g., movie, show, or supplemental content) rentals. In other examples, digital rights are not limited by time.

In some examples, data indicative of the first and/or second digital rights, or the transaction corresponding to assignment of such rights, may be stored to the database 133. Additionally or alternatively, data indicative of the first and/or second digital rights, or the transaction corresponding to assignment of such rights, may be stored in one or more blocks corresponding to a blockchain 152 (e.g., distributed ledger). Such data may include, for example, an identifier (e.g., user ID) of the user 132 or the user account 134, a time of transaction, characteristics of the digital rights, and/or other data. The blockchain 152 may be distributed, managed, controlled, or otherwise validated by a computer network 154 (e.g., peer-to-peer or P2P computer network) for use as a distributed ledger (e.g., public distributed ledger). In some examples, the system 110 (including the blockchain 152) may be employed in the context of Web-3 (e.g., Web 3.0). Additionally or alternatively, other data (e.g., data indicative of smart contracts, data indicative of non-fungible tokens or NFTs, described in detail below, which may be used to assign and/or monitor the above-described digital rights, and/or other data) may be stored to the blockchain 152, in the database 133, or both.

In some examples, one or more NFTs may be distributed (e.g., to the user account 134) in response to a purchase of a digital content package (e.g., including primary digital content, secondary digital content, or both). The NFT(s) may be distributed based on purchase of digital content packages corresponding to movie collections, bundles, and the like. As an example, a first NFT corresponding to the primary digital content (e.g., movie or show) or the associated first may be distributed to the user account 134, and a second NFT corresponding to the secondary digital content (e.g., content creator supplement) or the associated second digital right may be distributed to the user account 134. In some examples, one or more NFTs may be distributed to the content creator account 140 (e.g., in response to secondary digital content being approved, secondary digital content being purchased, etc.).

Data indicative of these NFTs may be stored in the database 133, the blockchain 152, or both. The servers 112 corresponding to the home entertainment entity 131 may enable the user account 134 to use the first digital right, the second digital right, or both in response to receiving or recognizing data indicative of the first NFT, the second NFT, or both, respectively, stored on the blockchain 152 or the database 133. Reference to "use" of the first digital right, the second digital right, or both in the present disclosure may mean, for example, watching the movie or show corresponding to the primary digital content, watching the content creator supplement corresponding to the secondary digital content, or both, respectively.

In some examples, the NFTs described above and/or the digital rights associated with such NFTs may be limited in scope (e.g., by time, by platform, etc.). For example, as previously described, the first digital right corresponding to the primary digital content may be accessible (e.g., watched) during a first limited period of time, which may begin with issuance of the first digital right, with the user 132 first accessing the primary digital content, or some other starting point. Additionally or alternatively, the secondary digital content may be accessible (e.g., watched) during a second limited period of time, which may begin with issuance of the second digital right, with the user 132 first accessing the secondary digital content, or some other starting point. In some examples, the second digital right corresponding to the secondary digital content (e.g., content creator supplement) is permanent or indefinite.

In some examples, the first NFT (or a first portion thereof) corresponding to the primary digital content and/or the first digital right may be withdrawn and/or modified when the first limited period of time expires, which may effectively extinguish the first digital right. Additionally or alternatively, the second NFT (or a second portion thereof) corresponding to the secondary digital content and/or the second digital right may be withdrawn and/or modified when the second limited period of time expires, which may effectively extinguish the second digital right. As an example, as previously described, the system 110 (e.g., via the servers 112) may enable use of the first digital right in response to receiving or recognizing data indicative of the first NFT. After withdrawing or modifying the first NFT, such receipt or recognition of the first NFT by the system 110 (e.g., via the servers 112) may no longer occur or otherwise be possible, thereby extinguishing the first digital right corresponding to the primary digital content. The same or similar processing techniques may be employed with respect to the second NFT, the second digital right, and/or the secondary digital content.

Additionally or alternatively, the first and second digital rights may be tailored to (e.g., limited by) user-specific data corresponding to the user 132 and/or the user account 134, such as an age of the user 132, registered media distribution platforms (e.g., Video-on-Demand platforms, streaming platforms, etc.) corresponding to the user account 134, etc. For example, the first digital right may allow the user 132 to watch the primary digital content on one or more media distribution platforms the user account 134 is registered with, but may exclude the user 132 from watching the primary digital content one or more medial distribution platforms the user account 134 is not registered with. The same or similar processing techniques may be employed with respect to the second NFT, the second digital right, and/or the secondary digital content.

While the above-described features and techniques are discussed in the context of digital content packages including primary digital content (e.g., a movie or show) and secondary digital content (e.g., content creator supplement), in some examples, the primary digital content and/or the secondary digital content may be purchased separately or the digital content package may include other types of digital content. For example, the user 132 may have previously purchased a digital content package including the primary digital content and the secondary digital content and then prefer to purchase additional secondary digital content corresponding to an additional content creator supplement. Such offerings, purchases, and digital rights may be executed similar to the description of the digital content packages described above. In some examples, the system 110 (e.g., the servers 112) may require that the user 132 purchased the primary digital content corresponding to a particular movie or show (or set of movies or shows) prior to enabling the user 132 to separately purchase additional secondary digital content related to the primary digital content.

As another aspect of the present disclosure, an amount of at least the secondary digital content available for purchase (e.g., by the user 132 and similar such users) may be limited by the system 110. For example, as previously described, NFTs may be distributed to users, such as the user 132, that purchase the digital content packages offered by the system 110. A number of the NFTs (and, thus, instances of the secondary digital content) may be limited by minting criteria. For example, the NFTs corresponding to the secondary digital content may be minted based on the minting criteria. The minting criteria may include one or more factors, such as a popularity metric of the content creator 138, an input to the servers 112 by the content creator 138 (e.g., via the content creator device 136), an age of the content creator 138 or the content creator account 140, other demographic information corresponding to the content creator 138, a price of the secondary digital content (which may be determined by the content creator 138 and/or the home entertainment entity 131), etc. The popularity metric may be based on, for example, user ratings of secondary digital content produced by the content creator 138 and rated by users, such as the user 132 via the user account 134. Primary digital content (e.g., movies or shows themselves) may also be rated by users of the system 110, and may affect popularity metrics of content creators in certain examples.

Certain of the minting criteria may be dictated by the home entertainment entity 131 (e.g., via a rating system or other inputs implemented by the home entertainment entity 131). In this way, the home entertainment entity 131 may be capable of controlling the content environment enabled by the system 110 to promote certain content creators (e.g., the content creator 138) and/or certain secondary digital content, thereby enabling the home entertainment entity 131 to exert some level of control based on business and other factors.

Further to the remarks above, in some examples, NFTs may be transferrable between various parties involved in the system 110, such as the user 132, additional users, the content creator 138, and/or additional content creators. As an example, the user 132 may transfer one or more NFTs belonging to the user 132 (e.g., assigned to the user account 134) and corresponding to a digital content package to an additional user account 156 of an additional user 158. The additional user 158 may employ an additional user device 160 to purchase or otherwise receive the one or more NFTs. Transaction data corresponding to the transfer, the NFT, the digital rights associated with the transfer and/or the NFT, and other possible transaction data may be stored on the blockchain 152 and/or in the database 133. In this way, any digital rights associated with the NFT may be transferred to the additional user 158 via the additional user account 156. It should be noted that, in some examples, a particular party in the system 110 may be both a user and a content creator (or curator). That is, the user 132 and/or the additional user 158 may also produce digital content offered to other users through the system 110.

In general, the system 110 of FIG. 2 enables improved digital content packages and features, improved user accessibility, improved digital content environments, improved interaction between users and content creators, reduced cost to various involved parties (e.g., consumers, producers, operators, content creators such as influencers, celebrities, or actors, etc.), and other technical benefits over traditional techniques.

Figure 3:
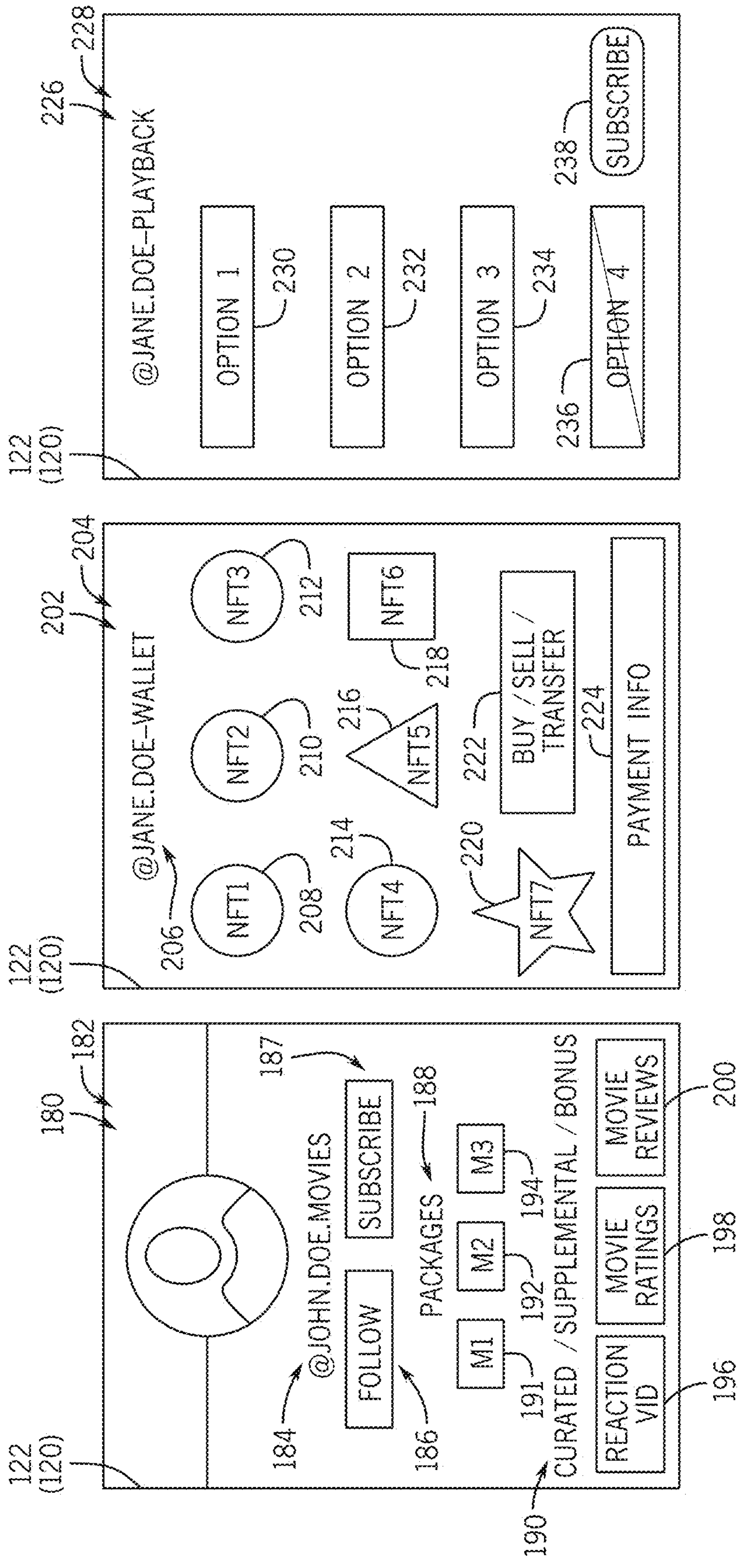
FIG. 3 is schematic illustration of various graphical user interfaces (GUIs) presentable on a display of a user device interacting with aspects of the home entertainment content system of FIG. 2, in accordance with examples of the present disclosure.

FIG. 3 is schematic illustration of an example of various graphical user interfaces (GUIs) presentable on the display 122 of the user device 120 interacting with aspects of the home entertainment content system 110 of FIG. 2. In the illustrated example, a first GUI 180 illustrates a content creator (e.g., curator, influencer, etc.) profile 182 having a content creator name 184, a follow option 186, a subscribe option 187, various digital content packages 188, and supplemental material 190. The digital content packages 188 may include a first package 191, a second package 192, a third package 194, and so on and so forth. The supplemental material 190 may include material such as movie reactions 196 produced by the content creator, movie ratings 198 produced by the content creator, movie reviews 200 produced by the content creator, and other material. In some examples, each of the packages 191, 192, 194 may include various digital content, such as primary digital content (e.g., one or more movies or shows) and secondary digital content (e.g., content creator supplements). In some examples, the secondary digital content included in the packages 191, 192, 194 may correspond to the supplemental material 190, which may also be offered separately as shown. The display 122 (e.g., touchscreen) of the user device 120 may be employed for selecting and/or purchasing any of the packages 188 and/or supplemental material 190 illustrated on the first GUI 80.

As previously described, NFTs may be distributed (e.g., to the user of the user device 120) based on the above-described selections and/or purchases, where the NFTs (e.g., in some examples) are employed to monitor and enable digital rights in digital content. A second GUI 202 in the illustrated example corresponds to a digital wallet 204 of the user of the user device 120, where a user name 206 of the user (e.g., corresponding to the user account) is illustrated in the second GUI 202. The second GUI 202 may also include illustrations corresponding to various NFTs held by the user, such as a first NFT 208, a second NFT 210, a third NFT 212, a fourth NFT 214, a fifth NFT 216, a sixth NFT 218, and a seventh NFT 220.

As shown, the NFTs 208, 210, 212, 214, 216, 218, 220 may include various characteristics, such as various shapes. Other characteristics of the NFTs 208, 210, 212, 214, 216, 218, 220 may include color, graphical illustrations, videos, size, etc. In some examples, characteristics of the NFTs 208, 210, 212, 214, 216, 218, 220 may be selected or designed by a content creator (e.g., curator), such as the one corresponding to the profile 182 illustrated in the first GUI 180. In some examples, such content creator designed NFTs may correspond to digital content sold by the content creator and/or to rewards for subscribing (e.g., via paid subscription) to the content creator channel, which may entitle the subscriber to various rewards assigned to such NFTs (e.g., free secondary digital content, free primary digital content, etc.). The second GUI 202 may also include a buy/sell/transfer option 222 by which the NFTs 208, 210, 212, 214, 216, 218, 220 may be sold, transferred, or traded, and by which other NFTs may be bought. In some examples, the digital wallet 204 may also enable the user to read/write on the blockchain 152 in FIG. 2 via use of a digital ID, securely store user data and content in a data locker (e.g., which can be ported into Web-3 applications with user permission), read and execute logic outlined in smart contracts, store and manage cryptocurrency (e.g., NFTs or other cryptographic tokens) and fiat currency, etc.

A third GUI 226 in FIG. 3 may include playback options page 228 illustrating various playback options for viewing digital content, such as a first playback option 230, a second playback option 232, a third playback option 234, and a fourth playback option 236. In the illustrated example, the user account corresponding to the user device having the third GUI 226 displayed on the display 122 can access the first, second, and third playback options 230, 232, 234 (e.g., said user account is registered with or subscribed thereto) but not the fourth playback option 236 (e.g., said user account is not registered with or subscribed thereto). However, the third GUI 226 may include a subscribe option 238 with respect to the fourth playback option 236, enabling the user to employ the fourth playback option 236 by subscribing thereto.

Figure 4:
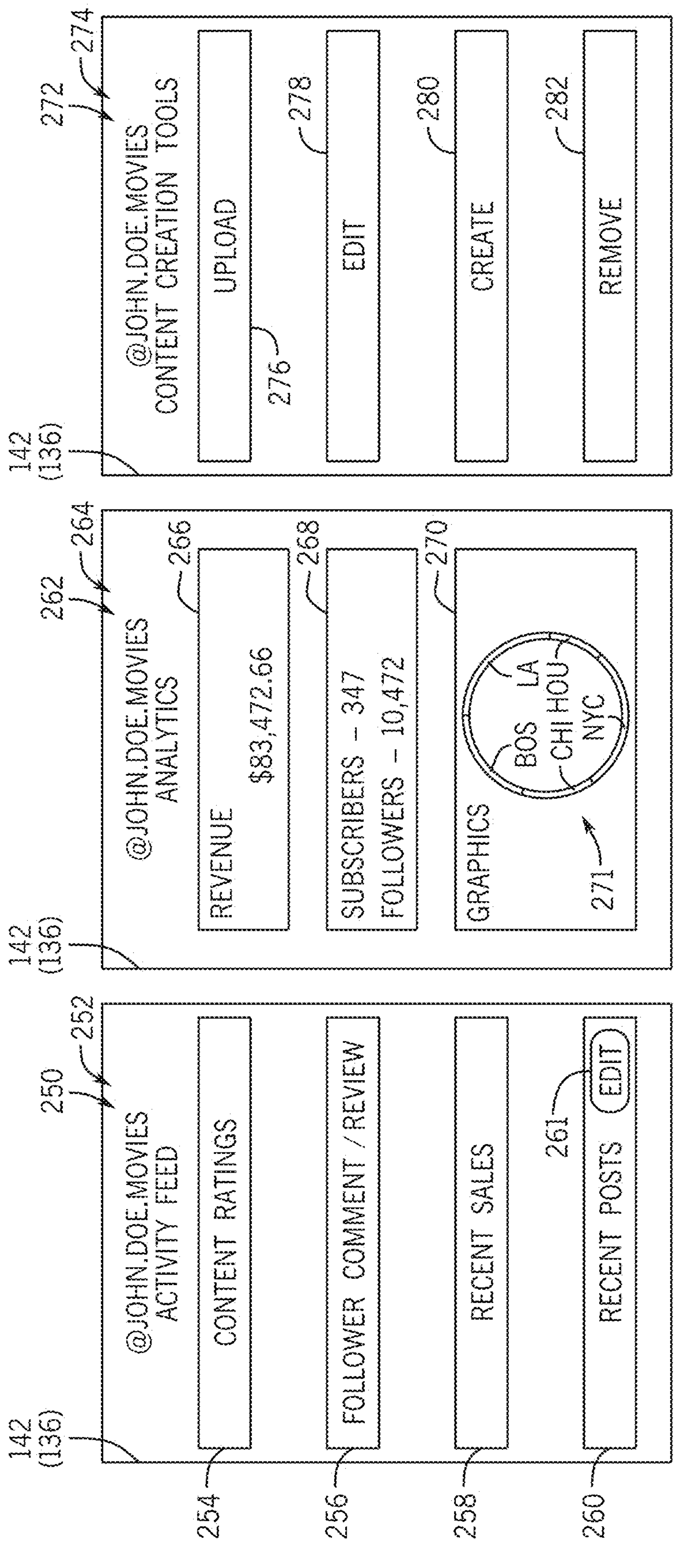
FIG. 4 is a schematic illustration of various graphical user interfaces (GUIs) presentable on a display of a content creator device interacting with aspects of the home entertainment content system of FIG. 2, in accordance with examples of the present disclosure.

FIG. 4 is a schematic illustration of an example of various graphical user interfaces (GUIs) presentable on the display 142 of the content creator device 136 of FIG. 2 interacting with aspects of the home entertainment content system 110 of FIG. 2. A first GUI 250 in the illustrated example includes an activity feed 252 of a content creator. The activity feed 252 may include, for example, content ratings 254, follower comments (and/or reviews of digital content produced by the content creator), recent sales information 258, recent posts 260 by the content creator, etc. The activity feed 252 may also include an editing option 261 for editing the recent posts 260 by the content creator, although other editing options may be included in later-described content creator tools.

A second GUI 262 in the illustrated example includes an analytics page 264, which may include a revenue indicator 266, a subscriber/follower indicator 268, and graphical depictions 270 (e.g., including one or more graphs 271, such as a graph depicting locations of followers and/or subscribers). A third GUI 272 in the illustrated example includes content creation tools 274 employed by the content creator for generating creator content (e.g., the aforementioned secondary digital content, digital content supplements, etc.). The content creation tools 274 may enable the content creator to upload 276 content, edit 278 previously generated content, create 280 content, and/or remove 282 content.

FIG. 5 is a process flow diagram illustrating an example of a method 300 of employing the home entertainment content system 110 of FIG. 2. It should be noted that the following discussion should not be taken as necessarily implying an order of operations, although the method 300 may be performed in the order illustrated in FIG. 5 and described below. Further, certain examples of the method 300 may not employ every step or block illustrated in FIG. 5. Further still, certain examples of the method 300 may employ other steps or blocks not illustrated in FIG. 5. FIG. 5 is provided as one example of the method 300, although other examples are possible in accordance with the present disclosure.

In the illustrated example, the method 300 includes receiving (block 302), via processing circuitry, an indicator of a purchase of a digital content package by a user. As previously described, the digital content package may include, in some examples, primary digital content (e.g., one or more movies or shows) and secondary digital content (e.g., a content creator supplement to the one or more movies or shows, such as reviews, ratings, reactions, etc.). It should be noted that the processing circuitry referred to in the method 300 of FIG. 5 and any other methods in accordance with the present disclosure may belong to a single device or distributed across a number of devices, such as any of the devices in FIG. 2 (e.g., the servers 112, the user device 120, the content creator device 136, the additional user device 160, etc.).

The method 300 also includes assigning (block 304), via the processing circuitry, a digital right in the digital content package to the user. The digital right may include multiple digital rights, such as a first digital right in the primary digital content and a second digital right in the secondary digital content. In some examples, one or more such digital rights is limited in time or some other scope. For example, the first digital right in the primary digital content may expire after a first limited period of time, the second digital right in the secondary digital content may expire after a second limited period of time, or both. The digital rights may be additionally or alternatively limited by a number of views or some other scope.

The method 300 also includes distributing (block 306), via the processing circuitry, a cryptographic token (e.g., a non-fungible token or NFT) corresponding to the digital right(s), the digital content package, or both to the user. Further, the method 300 includes recording (block 308), via the processing circuitry, transaction data associated with any of blocks 302, 304, or 306 described above. For example, the transaction data may include data indicative of the purchase in block 302, data indicative of the digital right in block 304, data indicative of the cryptographic token in block 306, and/or other data.

The method 300 also includes enabling (block 310), via the processing circuitry, use of the digital right by the user. For example, the processing circuitry may enable use of the digital right by the user by allowing the user to download purchased material to the user device, stream the purchased material via the user device, etc. In some examples, the processing circuitry may enable the use of the digital right in response to receiving or recognizing data indicative of the cryptographic token (e.g., NFT) and/or any other data stored on the blockchain described above.

The method 300 also includes recording (block 312), on the blockchain and via the processing circuitry, additional transaction data indicative of a transfer of the digital right, the cryptographic token (e.g., NFT), and/or portions thereof from the user to an additional user. For example, as previously described, the user may opt to sell, transfer, or otherwise relinquish the digital rights in digital content. In some examples, another user may purchase the digital rights. The purchase may include, for example, a transfer of the corresponding NFT to the additional user. Indeed, as previously described, the NFT may be employed (e.g., by the additional user) to use or otherwise access the digital rights in the digital content at issue.

The method 300 also includes extinguishing (block 314), via the processing circuitry, the digital right in the digital content in response to one or more conditions. For example, the one or more conditions may include the limited time period(s) associated with the digital rights expiring. In some examples, the NFT (or a portion thereof) corresponding to such digital rights may be withdrawn from the user (or the additional user, if the NFT is transferred to the additional user) or otherwise modified or altered in response to the one or more conditions being met. In effect, withdrawal, modification, or altering of the NFT may extinguish the digital rights (e.g., the NFT may no longer be usable for accessing the digital rights). Of course, in some examples, digital rights may be assigned and/or usable permanently or indefinitely.

FIG. 6 is a process flow diagram illustrating an example of a method 400 of employing the home entertainment content system 110 of FIG. 2, including minting and distribution of cryptographic tokens (e.g., NFTs). It should be noted that the following discussion should not be taken as necessarily implying an order of operations, although the method 400 may be performed in the order illustrated in FIG. 6 and described below. Further, certain examples of the method 400 may not employ every step or block illustrated in FIG. 6. Further still, certain examples of the method 400 may employ other steps or blocks not illustrated in FIG. 6. FIG. 6 is provided as one example of the method 400, although other examples are possible in accordance with the present disclosure.

In the illustrated example, the method 400 includes receiving (block 402), via processing circuitry, minting criteria corresponding to a cryptographic token (e.g., NFT) associated with, for example, particular digital content (e.g., a digital content package including primary digital content and secondary digital content). It should be noted that the processing circuitry referred to in the method 400 of FIG. 6 and any other methods in accordance with the present disclosure may belong to a single device or distributed across a number of devices, such as any of the devices in FIG. 2 (e.g., the servers 112, the user device 120, the content creator device 136, the additional user device 160, etc.). The minting criteria in block 402 may include, for example, a popularity metric of a content creator corresponding to at least a portion of the digital content, an age of a content creator account corresponding to the content creator, a price of the digital content or a portion thereof, an input received from the content creator account, an input by a home entertainment entity (e.g., digital content provider), or any combination thereof. Other minting criteria may also be employed.

The method 400 also includes inputting (block 404), via the processing circuitry, the minting criteria to a minting algorithm. As previously described, the minting criteria may include one or more inputs, such as those described above with respect to block 402. The minting algorithm may employ any or all of the minting criteria to determine a minting number for the cryptographic token associated with the digital content at issue. That is, a number of the cryptographic tokens, or NFTs, may be limited by an output from the minting algorithm.

The method 400 also includes minting (block 406) the cryptographic tokens (e.g., NFTs) based on the output from block 404. In some examples, minting the cryptographic tokens also includes limiting use of the cryptographic tokens based on characteristics of the digital content (e.g., such that the cryptographic tokens and corresponding digital rights are usable for limited time periods, or based on other limitations described throughout the present disclosure).

The method 400 also includes offering (block 408) the cryptographic tokens (e.g., NFTs) and corresponding digital content and digital rights to users of the system. For example, digital content (e.g., digital content packages, which may include primary digital content and/or secondary digital content) may be offered to users of the system in a Web-3 enabled marketplace, which may be implemented in a computing application (e.g., desktop and/or mobile application). As previously described, the computing application may be a social media application configured to connect users with content creators that generate at least a part of the digital content (e.g., the secondary digital content, referred to in certain instances of the present disclosure as content creator supplements) being offered.

The method 400 also includes distributing (block 410) the cryptographic tokens (e.g., NFTs) in response to purchases or transfers thereof. For example, the cryptographic tokens, or data indicative thereof, may be transferred to digital wallets of the purchasers or users of the system. As previously described, such cryptographic tokens may also be transferred between users of the system. Further, as previously described (e.g., in the method 300 of FIG. 5), the cryptographic tokens in certain examples may be used by the possesors thereof to access the digital right(s) corresponding to the digital content associated with the cryptographic tokens.

The method 400 also includes storing (block 412) minting data, NFT data (e.g., possessional data), transaction data (e.g., transfer, sale, purchase data), and/or any other data associated with the method 400 (e.g., in blocks 402, 404, 406, 408, and 412) to a blockchain. As previously described, in some examples, the processing circuitry may enable the user (e.g., possessor of a cryptographic token) to access digital rights corresponding to digital content in response to receiving or recognizing their cryptographic tokens (or data indicative thereof, such as data stored to the blockchain). In this way, examples of the system 110 in FIG. 3, examples of the method 300 in FIG. 5, and/or examples of the method 400 in FIG. 6 may be employed to leverage the versatile nature of digital content (e.g., movies, shows, etc.) and/or Web-3 technologies for improved customer satisfaction, seamless facilitation of data across platforms and third party experiences, tokenization of assets, new revenue streams or models, audit trails via public ledger of transactional history, and/or other technical benefits in accordance with the present disclosure.

FIG. 7 is a schematic illustration of an example of a use case 500 employing some or all of the workflows, systems, and/or methods of FIGS. 1-6, and illustrating various affiliate or vendor relationships employed therein. "Affiliate," as used herein, may include, but is not necessarily limited to, one or more studios (e.g., movie studios), theaters (e.g., movie theaters) or other entertainment venues (e.g., amusement parks), content community platforms (e.g., review aggregator platforms), content creators or influencers, device manufacturers, and/or other vendors or parties. While the illustrated example includes a primary content creator 502 (e.g., a movie studio), a content community affiliate 504 (e.g., a movie review aggregator platform), an influencer 506 (e.g., a content creator) participating with (e.g., platformed by) the content community affiliate 504, a device affiliate 508 (e.g., a device manufacturer), and fans 510 (e.g., users participating in the content community affiliate 504 and/or employing devices produced by the device affiliate 508), other affiliates, vendors, and/or parties are also possible.

In the illustrated use case 500, the primary content creator 502 (e.g., a movie studio) may employ a smart contract 512 to monitor, distribute, generate, or otherwise account for various relationships between the primary content creator 502 and other parties. Additionally or alternatively, the influencer 506 may employ a smart contract 514 to monitor, distribute, generate, or otherwise account for various relationships between the influencer 506 and other parties. In some examples, the smart contract 512 associated with the primary content creator 502 and the smart contract 514 associated with the influencer 506 may be related. For example, the smart contract 512 associated with the primary content creator 502 may enable the influencer 506 to access various content, such as digital content (e.g., movies, shows, etc.) made or otherwise distributable by the primary content creator 502, while the smart contract 514 associated with the influencer 506 may enable the fan 510 subscribed to or otherwise transacting with the influencer 506 to access the same digital content (e.g., movies, shows, etc.). That is, the digital content corresponding to the primary content creator 502 may be accessed by the fan 510 by way of the influencer 506. Based on affiliate relationship data stored to the smart contract 512 and/or the smart contract 514, in addition to data indicative of transactions between the influencer 506 and the fan 510 in certain examples, revenue shares 516 may be distributed by the primary content creator 502 to the influencer 506. For example, the fan 510 (or user) may receive a token 517, which may be or include an NFT, employed by the fan 510 to access the digital content (e.g., movies, shows, etc.) or other content at issue. As previously described, the token 517 may grant a variety of rights and/or benefits to the fan 510, including primary content, secondary content, poster art, custom artwork, creator bonus content, access to the community of the influencer 506, etc. In some examples, the token 517 or other authentication techniques are employed to enable the fan 510, the influencer 506, or both access to community features 518 associated with the content community affiliate 504, such as community challenges, access to exclusive forums, verified reviewer status, and the like.

Additionally or alternatively, based on affiliate relationship data stored to the smart contract 512 and/or the smart contract 514, data indicative of transactions between the influencer 506 and the fan 510, data indicative of transactions between the fan 510 and the content community affiliate 504, data indicative of other transactions, or any combination thereof, revenue shares 520 may be distributed by the primary content creator 502 to the content community affiliate 504.

In some examples, as illustrated in the use case 500 in FIG. 7, the device affiliate 508 may also play a role in content transactions. For example, if the fan 510 opts to play content on a device produced (e.g., manufactured, sold, etc.) by the device affiliate 508, the fan 510 may receive still further benefits or rights to secondary content associated with the primary content (e.g., movie, show, etc.) at issue. Device benefits 522 may include, for example, custom wallpapers and/or screen savers, cover art, exclusive profile icons, custom themes, and the like. In some examples, affiliate relationship data is stored to the smart contract 512 indicative of a relationship between, for example, the primary content creator 502 and the device affiliate 508. Such relationship data may include, for example, information indicative of revenue shares 524 distributable by the primary content creator 502 to the device affiliate 508.

In certain examples, the revenue shares 516, 520, 524 may be distributed once after transaction sale revenue 526 is received by the primary content creator 502, as shown. In some examples, the transaction sale revenue 526 includes pass through revenue 528 (e.g., playback transaction revenue) from the fans 510 employing a device produced (e.g., manufactured) by the device affiliate 508, as shown. In other examples, when a transaction is completed, a portion of the transaction revenue is received by the primary content creator 502 and additional portions of the transaction revenue are kept by the other parties involved in the transaction, such as the content community affiliate 504, the influencer 506, and/or the device affiliate 508.

FIG. 8 is a schematic diagram of an example of an enhanced ticketing system that may implement all or some of the workflow of FIG. 1. Referring to FIG. 8, an enhanced ticket 1102 that includes (or is) an NFT may be created (or minted) when a movie trailer 1104 is released. In the movie context, an enhanced ticket may be considered an enhanced movie ticket. For example, after watching the movie trailer, a QR code may be presented to the user to enable the user to obtain the enhanced ticket 1102. In an aspect, the enhanced ticket 1102 may be created or generated immediately after the user watches the movie trailer. In another aspect, the enhanced ticket 1102 may be pre-created ahead of time and assigned to a user after the user has been verified to have watched the movie trailer. An advantage of pre-creating or pre-minting the enhanced ticket 1102, as opposed to minting after the user watches the movie trailer, is the reduction in latency when assigning the enhanced ticket 1102 to the user in case there are many users watching the movie trailer simultaneously.

As shown in FIG. 8, the enhanced ticket 1102 may include an image associated with the movie or content. The enhanced ticket 1102 may be associated with features like a chat thread, a user rating score, a ticket issue date, where the ticket was used (e.g., a location or an entity), and a rarity role. The chat thread and user rating score may be available only to other enhanced ticket holders associated with the movie trailer 1104, creating an exclusive or private group of people that could interact with each other. The usage element keeps track of the different locations where the enhanced ticket 1102 was used or redeemed (e.g., redeemed at a movie theater) and/or what vendor or partner redeemed the enhanced ticket 1102. The rarity role indicates the state of the enhanced ticket 1102, and the state of the enhanced ticket 1102 may indicate its uniqueness or rarity. Factors that impact the rarity of the enhanced ticket 1102 may include the ticket issue date (the first issued ticket may be more valuable), where the ticket was used (e.g., enhanced tickets redeemed at several partners may be more valuable), and the user profile (e.g., an enhanced ticket belonging to a movie cast member, or a loyal customer may be considered rarer).

The enhanced ticket 1102 may evolve or be upgraded after a movie release 1106. For example, if the user paid to watch the movie in theaters, the enhanced ticket 1102 will provide the user with entry rights into a movie theater selected by the user to redeem the movie ticket portion of the enhanced ticket 1102. Then, when the movie progresses to a home entertainment window 1108, the enhanced ticket 1102 may be upgraded by an authorized partner to provide the user with movie playback rights.

The lower portion of FIG. 8 (below the trailer, ticket, and home entertainment drop) shows how the enhanced ticket 1102 may interact with different authorized partners. The enhanced ticket 1102 may be created through a trailer function 1110. Alternatively, the enhanced ticket 1102 may be created by a ticketing service (e.g., Fandango) after the movie release 1106. In another alternative, the enhanced ticket 1102 may be created by a theater. In this alternative, the theater may be creating a new enhanced ticket or redeeming a ticket token based on an enhanced ticket purchased through a ticketing service.

FIG. 8 also illustrates how the enhanced ticket 1102 may evolve based on interactions with various third-party partners 1120A-G. Each third-party partner 1120A-G may have access to the enhanced ticket 1102, including the ability to read its contents and to make changes to the enhanced ticket 1102 such as upgrading its rarity role or access rights. For example, when a user enters a theme park and uses the enhanced ticket 1102 to perform an action, the theme park, as an approved partner, may upgrade the enhanced ticket 1102, making it rarer. The action may include attending a private event or purchasing special access at the theme park. The theme park may add its location to the list of locations at which the enhanced ticket 1102 was used. In another scenario, the enhanced ticket 1102 may provide the user with special access to the theme park (front of the line pass or access to special events) based on the rarity role of the enhanced ticket 102.

As another example, a television manufacturer 1120D may have permission to access the enhanced ticket 1102 if playback of the movie was initiated by a television associated with the television manufacturer 1120D. The television manufacturer 1120 may indicate that the enhanced ticket 1102 was used by the user for playback on the television and may then upgrade the rarity role of the ticket to reflect the additional playback.

Similar upgrades may be performed by a streaming service 1120F and/or a digital content (e.g., video) store 1120G. The streaming service(s) and/or digital content (e.g., video) store(s) may have permission to unlock the content associated with the enhanced ticket 1102 to enable user playback. And when playback is complete, the streaming service(s) and/or digital content (e.g., video) store(s) may upgrade the ticket by indicating that the streaming service(s) and/or digital content (e.g., video) store(s) was used for playback.

Since the enhanced ticket 1102 includes an NFT, access to and modification of the enhanced ticket 1102 may be enabled through blockchain technology. This technology also enables the enhanced ticket 1102 to be listed on marketplaces 1130 (e.g., OpenSea), which may be able to access information about the enhanced ticket 1102 to provide a current valuation for the enhanced ticket 1102 (or the underlying NFT). The possessor of the enhanced ticket 1102 may be able to sell the enhanced ticket 1102 to another user, while keeping the same rarity role even if the enhanced ticket 1102 now belongs to a different user and the rarity role was associated with the value of original possessor. In this case, the enhanced ticket 1102 may contain a record of the original possessor in order to not have the rarity role effected by the sale. That is, the rarity role may be influenced by the identity or profile the current possessor and one or more previous possessors. In an aspect, once a user sells the enhanced ticket 1102 for a particular piece of content, the user may not be able to repurchase another enhanced ticket 1102 for the same content, but may be able to repurchase the original enhanced ticket 1102 previously sold by that user. By keeping a record of the original possessor, the restriction on repurchasing may be enforced by a centralized ticketing entity.

The third-party partners 1120A-G are not intended to be an exhausting list of potential third-party partners and other partners may be integrated. Those other partners may include any location-based businesses, including physical retail stores that are authorized to access the enhanced ticket 1102 and record any interactions with the user in order to provide user access to different features of the location-based business or to upgrade the user's enhanced ticket 1102.

Continuing with FIG. 9, a series of functions may be used to operate the enhanced ticket. Although the functions have been given a particular name, other suitable names may also be used. For example, a mint( ) function to create or generate the enhanced ticket may be called by a service after confirming that a user has watched a movie trailer or purchased a movie ticket. In an aspect, the min( ) function may take as an input name or identifier of the content watched. A purchase( ) function may be called by an entity that has confirmation that a user has purchased a movie ticket to watch the movie. Parameters for the purchase( ) function include the callerAddress and the userAddress, so the function will fail if the entity is not on the whitelist for upgrading the enhanced ticket to a redeemable movie ticket. If the entity is on the whitelist, then the effect of the purchase( ) function would be to upgrade the enhanced ticket to include a redeemable theater ticket.

A convert2EST( ) function may be called by a streaming service after confirming that a user has purchased the movie ticket and/or watched the movie at a theater. The convert2EST( ) function will fail if the streaming service is not on the whitelist for upgrading the enhanced ticket to enable streaming playback. By contrast, if the entity is on the whitelist, then the effect of the convert2EST( ) function would be to upgrade the enhanced ticket to include access to an EST retailer to playback the movie.

An updateRating( ) function may be called by the user, who is the possessor of the enhanced ticket. The updateRating( ) function includes parameters such as the callerAddress and the designated user rating. If the callerAddress matches the identifier associated with the possessor of the enhanced ticket, then the user rating associated with the content for the enhanced ticket may be updated.

An addComment( ) function may be called by the user, who is the possessor of the enhanced ticket. The addComment( ) function includes parameters such as the callerAddress and the user comments. If the callerAddress matches the identifier associated with the possessor of the enhanced ticket, then the comments provided by the user will be shown in the comment thread associated with the enhanced ticket may be updated and published to other users that have an enhanced ticket for the same content.

Additional functions may be accessible by a studio, a content possessor or creator, or content manager. The addPurchase Whitelist( ) function may be called to add new entities to the whitelist with access to call the purchase( ) function. The addPurchase Whitelist( ) includes the callerAddress and new Address as parameters. If the callerAddress matches the studio address associated with the enhanced ticket, then the studio is able to add new partners or vendors authorized to make theater redeemable tickets associated with the enhanced ticket. Similarly, a remove- Purchase Whitelist( ) function with similar parameters may be called by an authorized studio to remove a previously authorized partner or vendor from the purchase whitelist.

The addConvert2ESTWhitelist( ) function may be called by a studio, a content possessor or creator, or content manager associated with the enhanced ticket. The addConvert2ESTWhitelist( ) includes the callerAddress and newAddress as parameters. If the callerAddress matches the studio address associated with the enhanced ticket, then the studio is able to add new partners or vendors authorized to provide streaming access to the movie to the user. Similarly, a removeConvert2ESTWhitelist( ) function with similar parameters may be called by an authorized studio to remove a previously authorized partner or vendor from the streaming partner whitelist.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A computer-implemented method, comprising:

receiving, via processing circuitry corresponding to one or more processors and from a first user account, an indication of a purchase of a digital content package, the digital content package including primary digital content comprising a movie or show and secondary digital content corresponding to a content creator supplement to the movie or show, the content creator supplement comprising a content creator review of the movie or show;

assigning, via the processing circuitry, based on the indication, and to the first user account, a first digital right to the primary digital content for a first limited period of time;

receiving, via the processing circuitry, a first transaction request to transfer or share the first digital right to the primary digital content for the first limited period of time from the first user account to a second user account;

assigning, via the processing circuitry, based on the first transaction request, and to the second user account, the first digital right to the primary digital content for the first limited period of time;

receiving, via the processing circuitry, within the first limited period of time, and from the second user account, at least one first request to access the primary digital content based on the first digital right;

granting, via the processing circuitry, the second user account access to the primary digital content based on the at least one first request;

assigning, via the processing circuitry, based on the indication, and to the first user account, a second digital right to the secondary digital content;

receiving, via the processing circuitry, a second transaction request to transfer or share the second digital right to the secondary digital content from the first user account to a third user account;

assigning, via the processing circuitry, based on the second transaction request, and to the third user account, the second digital right to the secondary digital content;

receiving, via the processing circuitry and from the third user account, at least one second request to access the secondary digital content based on the second digital right; and granting, via the processing circuitry, the third user account access to the secondary digital content based on the at least one second request.

2. The computer-implemented method of claim 1, comprising storing, via the processing circuitry, transaction information corresponding to the purchase of the digital content package on a blockchain.

3. The computer-implemented method of claim 1, comprising distributing, via the processing circuitry, at least one non-fungible token (NFT) corresponding to the digital content package to the first user account.

4. The computer-implemented method of claim 1, comprising:

distributing, via the processing circuitry, a first non-fungible token (NFT) corresponding to the primary digital content to the first user account; and distributing, via the processing circuitry, a second NFT corresponding to the secondary digital content to the first user account.

5. The computer-implemented method of claim 1, comprising:

distributing, via the processing circuitry, a first non-fungible token (NFT) corresponding to the primary digital content to the first user account; and withdrawing or modifying, via the processing circuitry and from the first user account, the second user account, or both, the first NFT or a first portion thereof in response to the first limited period of time lapsing such that the first digital right is extinguished thereafter.

6. The computer-implemented method of claim 1, comprising assigning, via the processing circuitry and to the first user account, the second digital right for a second limited period of time, wherein the second limited period of time differs from the first limited period of time.

7. The computer-implemented method of claim 1, comprising:

assigning, via the processing circuitry and to the first user account, the first digital right to the primary digital content for the first limited period of time across a plurality of digital platforms subscribed to by the first user account; and excluding, via the processing circuitry, the first digital right to the primary digital content for the first limited period of time from being applicable to an additional plurality of digital platforms not subscribed to by the first user account.

8. The computer-implemented method of claim 1, comprising receiving, via the processing circuitry, the indication of the purchase of the digital content package in the form of:

data relating to an enhanced ticket corresponding to an in-theater screening of the movie or show; or data relating to a non-fungible token (NFT) associated with the enhanced ticket.

9. The computer-implemented method of claim 1, comprising:

minting, via the processing circuitry, a plurality of non-fungible tokens (NFTs) corresponding to a plurality of second digital rights to the secondary digital content and based at least in part on a minting criteria, wherein the plurality of second digital rights to the secondary digital content includes the second digital right, and the minting criteria is based at least in part on a popularity metric of a content creator corresponding to the content creator supplement, an age of a content creator account corresponding to the content creator, a price of the secondary digital content, an input received from the content creator account, or any combination thereof; and distributing, via the processing circuitry, the plurality of NFTs to a plurality of user accounts, the plurality of user accounts including the first user account.

10. One or more tangible, non-transitory, computer-readable media storing instructions thereon that, when executed by processing circuitry corresponding to one or more processors, are configured to cause the processing circuitry to:

receive, from a first user account, an indication of a purchase of a digital content package, the digital content package including primary digital content comprising a movie or show and secondary digital content corresponding to a content creator supplement to the movie or show, the content creator supplement comprising a content creator review of the movie or show;

assign, to the first user account and based on the indication, a first digital right to the primary digital content for a first limited period of time;

receive a first transaction request to transfer or share the first digital right to the primary digital content for the first limited period of time from the first user account to a second user account;

assign, based on the first transaction request and to the second user account, the first digital right to the primary digital content for the first limited period of time;

receive, within the first limited period of time and from the second user account, at least one first request to access the primary digital content based on the first digital right;

grant the second user account access to the primary digital content based on the at least one first request;

assign, to the first user account and based on the indication, a second digital right to the secondary digital content;

receive a second transaction request to transfer or share the second digital right to the secondary digital content from the first user account to a third user account;

assign, based on the second transaction request and to the third user account, the second digital right to the secondary digital content;

receive, from the third user account, at least one second request to access the secondary digital content based on the second digital right; and grant the third user account access to the secondary digital content based on the at least one second request.

11. The one or more tangible, non-transitory, computer-readable media of claim 10, wherein the instructions, when executed by the processing circuitry, are configured to cause the processing circuitry to store transaction information corresponding to the purchase of the digital content package on a blockchain.

12. The one or more tangible, non-transitory, computer-readable media of claim 10, wherein the instructions, when executed by the processing circuitry, are configured to cause the processing circuitry to distribute at least one non-fungible token (NFT) corresponding to the digital content package to the first user account.

13. The one or more tangible, non-transitory, computer-readable media of claim 10, wherein the instructions, when executed by the processing circuitry, are configured to cause the processing circuitry to:

distribute a first non-fungible token (NFT) corresponding to the primary digital content to the first user account; and distribute a second NFT corresponding to the secondary digital content to the first user account.

14. The one or more tangible, non-transitory, computer-readable media of claim 10, wherein the instructions, when executed by the processing circuitry, are configured to cause the processing circuitry to:

distribute a first non-fungible token (NFT) corresponding to the primary digital content to the first user account; and withdraw or modify, from the first user account, the second user account, or both, the first NFT or a first portion thereof in response to the first limited period of time lapsing such that the first digital right is extinguished thereafter.

15. The one or more tangible, non-transitory, computer-readable media of claim 10, wherein the instructions, when executed by the processing circuitry, are configured to cause the processing circuitry to assign, to the first user account, the second digital right to the secondary digital content for a second limited period of time, wherein the second limited period of time differs from the first limited period of time.

16. The one or more tangible, non-transitory, computer-readable media of claim 10, wherein the instructions, when executed by the processing circuitry, are configured to cause the processing circuitry to:

assign, to the first user account, the first digital right to the primary digital content for the first limited period of time across a plurality of digital platforms subscribed to by the first user account; and exclude the first digital right to the primary digital content for the first limited period of time from applying to an additional plurality of digital platforms not subscribed to by the first user account.

17. The one or more tangible, non-transitory, computer-readable media of claim 10, wherein the instructions, when executed by the processing circuitry, are configured to cause the processing circuitry to:

mint a plurality of non-fungible tokens (NFTs) corresponding to a plurality of second digital rights to the secondary digital content and based on a minting criteria, wherein the plurality of second digital rights to the secondary digital content includes the second digital right, and the minting criteria is based at least in part on a popularity metric of a content creator corresponding to the content creator supplement, an age of a content creator account corresponding to the content creator, a price of the secondary digital content, an input received from the content creator account, or any combination thereof; and distributing the plurality of NFTs to a plurality of user accounts, the plurality of user accounts including the first user account.

* * * * *